United States Patent
Sridhara et al.

(10) Patent No.: US 11,354,108 B2
(45) Date of Patent: Jun. 7, 2022

(54) ASSISTING DEPENDENCY MIGRATION

(71) Applicant: International Business Machines Corporation, Armonk, NY (US)

(72) Inventors: Giriprasad Sridhara, Bangalore (IN); Utkarsh Milind Desai, Bangalore (IN); Srikanth Govindaraj Tamilselvam, Chennai (IN); Senthil Kumar Kumarasamy Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/806,630

(22) Filed: Mar. 2, 2020

(65) Prior Publication Data
US 2021/0271466 A1 Sep. 2, 2021

(51) Int. Cl.
*G06F 9/44* (2018.01)
*G06F 8/41* (2018.01)
(Continued)

(52) U.S. Cl.
CPC .............. *G06F 8/65* (2013.01); *G06F 8/75* (2013.01); *G06F 16/116* (2019.01);
(Continued)

(58) Field of Classification Search
CPC ..... G06F 8/65; G06F 8/75; G06F 8/51; G06F 8/73; G06F 8/76; G06F 8/77; G06F 8/433;
(Continued)

(56) References Cited

U.S. PATENT DOCUMENTS

| | | | |
|---|---|---|---|
| 8,863,114 B2 * | 10/2014 | Shah | ........................ G06F 8/60 717/175 |
| 10,769,250 B1 * | 9/2020 | Tautschnig | ............ G06F 21/577 |

(Continued)

OTHER PUBLICATIONS

Nasib S. Gill et al., Dependency and Interaction Oriented Complexity Metrics of Component-Based Systems, Jan. 2008, [Retrieved on Mar. 1, 2022], Retrieved from the internet: <URL: https://dl.acm.org/doi/pdf/10.1145/1350802.1350810> 5 Pages (1-5) (Year: 2008).*

(Continued)

*Primary Examiner* — Anibal Rivera
(74) *Attorney, Agent, or Firm* — Ryan, Mason & Lewis, LLP

(57) ABSTRACT

Methods, systems, and computer program products for assisting dependency migration are provided herein. A computer-implemented method includes determining differences between a first version of a dependency used by a software application and each of a plurality of upgrade candidates, the plurality of upgrade candidates comprising at least one of: (i) one or more newer versions of the dependency and (ii) a substitute dependency; identifying, based on the determined differences for a given one of the upgrade candidates, one or more sections of code of the software application that need to be patched in order to be compatible with the given upgrade candidate; and generating a modified version of the software application for the given upgrade candidate that comprises one or more patches for at least a portion of the identified one or more sections of code.

20 Claims, 10 Drawing Sheets

(51) Int. Cl.

| | |
|---|---|
| *G06F 8/72* | (2018.01) |
| *G06F 8/65* | (2018.01) |
| *G06F 8/75* | (2018.01) |
| *G06F 40/205* | (2020.01) |
| *G06F 16/2457* | (2019.01) |
| *G06F 16/11* | (2019.01) |
| *G06F 8/51* | (2018.01) |
| *G06F 8/658* | (2018.01) |
| *G06F 8/70* | (2018.01) |
| *G06F 8/10* | (2018.01) |
| *G06F 16/28* | (2019.01) |
| *G06F 8/73* | (2018.01) |
| *G06F 8/77* | (2018.01) |
| *G06F 8/60* | (2018.01) |
| *G06F 8/76* | (2018.01) |
| *G06F 8/20* | (2018.01) |

(52) U.S. Cl.
CPC ...... *G06F 16/24578* (2019.01); *G06F 40/205* (2020.01); *G06F 8/10* (2013.01); *G06F 8/20* (2013.01); *G06F 8/433* (2013.01); *G06F 8/51* (2013.01); *G06F 8/60* (2013.01); *G06F 8/658* (2018.02); *G06F 8/70* (2013.01); *G06F 8/73* (2013.01); *G06F 8/76* (2013.01); *G06F 8/77* (2013.01); *G06F 16/285* (2019.01)

(58) Field of Classification Search
CPC ..... G06F 8/70; G06F 8/10; G06F 8/20; G06F 8/658; G06F 8/60; G06F 8/34; G06F 8/71; G06F 8/48; G06F 8/72; G06F 8/436; G06F 16/24578; G06F 16/116; G06F 16/11; G06F 16/9024; G06F 16/21; G06F 16/51; G06F 40/205; G06F 16/285
See application file for complete search history.

(56) References Cited

U.S. PATENT DOCUMENTS

| | | | |
|---|---|---|---|
| 11,048,487 B1* | 6/2021 | Mestchian | G06F 8/72 |
| 2002/0160833 A1* | 10/2002 | Lloyd | A63F 13/60 |
| | | | 463/29 |
| 2005/0166094 A1* | 7/2005 | Blackwell | G06F 11/3688 |
| | | | 714/38.14 |
| 2008/0040401 A1* | 2/2008 | Reinsch | G06F 8/658 |
| 2008/0148225 A1* | 6/2008 | Sarkar | G06F 8/70 |
| | | | 717/107 |
| 2014/0089888 A1 | 3/2014 | Bhaskara et al. | |
| 2014/0304697 A1* | 10/2014 | Lin | G06F 8/65 |
| | | | 717/170 |
| 2015/0363294 A1* | 12/2015 | Carback, III | G06F 8/37 |
| | | | 717/132 |
| 2016/0062753 A1 | 3/2016 | Champagne | |
| 2017/0161061 A1 | 6/2017 | Eberlein et al. | |
| 2017/0177324 A1* | 6/2017 | Frank | G06F 16/173 |
| 2017/0192758 A1 | 7/2017 | Apte et al. | |

OTHER PUBLICATIONS

Jean-Remy Fallen et al., Fine-grained and accurate source code differencing, Sep. 2014, [Retrieved on Mar. 1, 2022], Retrieved from the internet: <URL: https://dl.acm.org/doi/pdf/10.1145/2642937.264298> 11 Pages (313-324) (Year: 2014).*

Christian Huffman, An Introduction to Red Hat Application Migration Toolkit, Red Hat Middleware Blog, https://www.ibm.com/cloud/garage/practices/learn/ibm-transformation-advisor. Posted on: May 24, 2018.

Niall Horgan and Vikram Gulati, IBM Cloud Transformation Advisor, Available at https://middlewareblog.redhat.com/2018/05/24/an-introduction-to-red-hat-application-migration-toolkit/, Accessed Mar. 2, 2020.

* cited by examiner

| | |
|---|---|
| 402 — methodName: | "com.google.common.io.ByteSink.openBufferedStream" |
| 404 — methodChangeType: | "RETURN_TYPE_CHANGED" |
| 406 — priority: | 1 |
| 408 — valueInVersion1: | "java.io.OutputStream" |
| 410 — valueInVersion2: | "java.io.BufferedOutputStream" |
| 412 — diffVersionValuesRelation: | "SUPER_TO_SUB_CLASS" |
| 414 — index: | -1 |
| 416 — additionalInformation: | "NA" |

ASSISTING DEPENDENCY MIGRATION

FIELD

The present application generally relates to information technology and, more particularly, to modernizing and/or migrating applications.

BACKGROUND

Application migration (or modernization) generally includes, for example, updating legacy applications with newer libraries, moving away from depreciating dependencies, and leveraging the latest application programming interfaces (APIs). Often times application migration also requires changes with respect to, for example, new frameworks, infrastructures (e.g., cloud infrastructures), and architectures. As such, application migration can be a difficult task that requires a thorough understanding of legacy applications architecture, modules, version dependency, host environments, etc.

SUMMARY

In one embodiment of the present disclosure, techniques for assisting dependency migration are provided. An exemplary computer-implemented method includes determining differences between a first version of a dependency used by a software application and each of a plurality of upgrade candidates, the plurality of upgrade candidates comprising at least one of: (i) one or more newer versions of the dependency and (ii) a substitute dependency; identifying, based on the determined differences for a given one of the upgrade candidates, one or more sections of code of the software application that need to be patched in order to be compatible with the given upgrade candidate; and generating a modified version of the software application for the given upgrade candidate that comprises one or more patches for at least a portion of the identified one or more sections of code.

Another exemplary computer-implemented method includes determining at least one outdated software library used by a software application; performing a static analysis of (i) the at least one outdated software library and (ii) one or more upgrade options for replacing the at least one outdated software library; performing a text analysis of (i) documentation information of the at least one outdated software library and (ii) documentation information of the one or more upgrade options; and generating a report comprising (i) differences identified between the outdated software library and each of the upgrade options based at least in part on the static analysis and the text analysis, (ii) one or more pieces of code in the software application that require modification in order to upgrade to each of the one or more upgrade options; and (iii) effort required to perform the required modification of the one or more pieces of code for each of the upgrade options.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 4 is a diagram illustrating an example of schema in accordance with exemplary embodiments;

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described herein, an exemplary embodiment includes modernizing applications by determining changes between existing dependencies and options for upgrading the existing dependencies. Determining the changes between the existing dependencies and the options for upgrading may be based on both a static analysis and a text analysis. Based on the determined differences, pieces of the software code can be identified that need to be modified to support the different upgrade options. Additionally, exemplary embodiments may include estimating effort to modernize the pieces of code and generating a summary (e.g., in an open-standard file format such as, for example, a JSON (JavaScript Object Notation) format) of the upgrade options, the identified pieces of code, and the estimated efforts. Further, relevant code changes may be suggested. At least one exemplary embodiment also includes learning one or more constraints, such as, for example, based on a user profile and licensing requirements.

Figure 1:
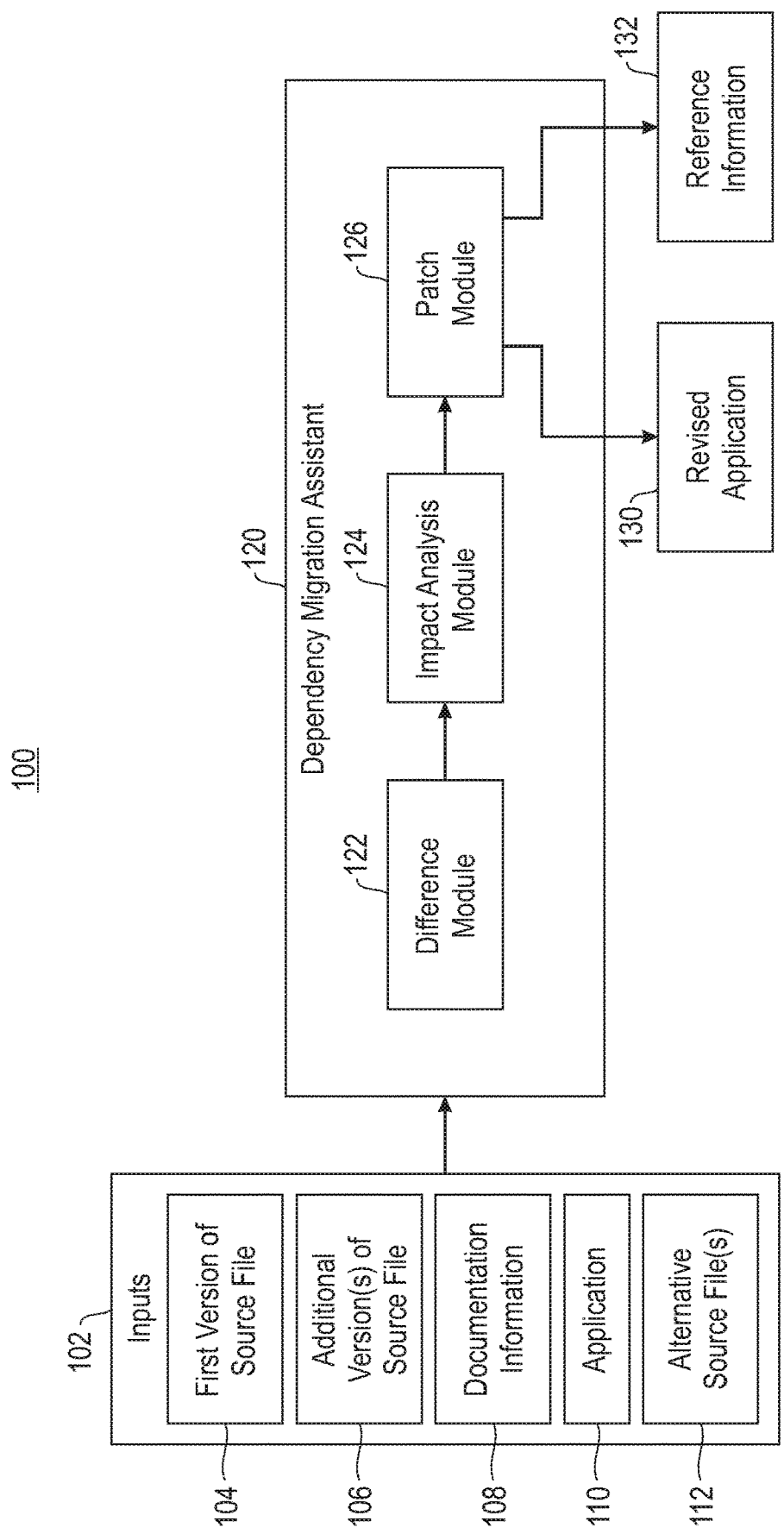
FIG. 1 is a diagram illustrating a system architecture in accordance with exemplary embodiments.

FIG. 1 is a diagram illustrating a system architecture 100 in accordance with exemplary embodiments. By way of illustration, FIG. 1 depicts a dependency migration assistant 120 that includes a difference module 122, an impact analysis module 124, and a patch module 126. The dependency migration assistant 120 obtains inputs 102, which, in the example shown in FIG. 1, include a first version of a source file 104 (e.g., a dependency source JAR (.class) file), one or more additional (e.g., newer) versions 106 of the source file, documentation information 108, an application 110, and an alternative source file 112. The documentation information 108 may include official documentation information for the first version of the source file 104, the one or more additional versions 106, and/or the alternate source file 112, for example. In the example shown in FIG. 1, the dependency migration assistant 120 generates a revised application 130 and reference information 132 based on the inputs 102 as discussed in further detail herein.

Figure 2A:
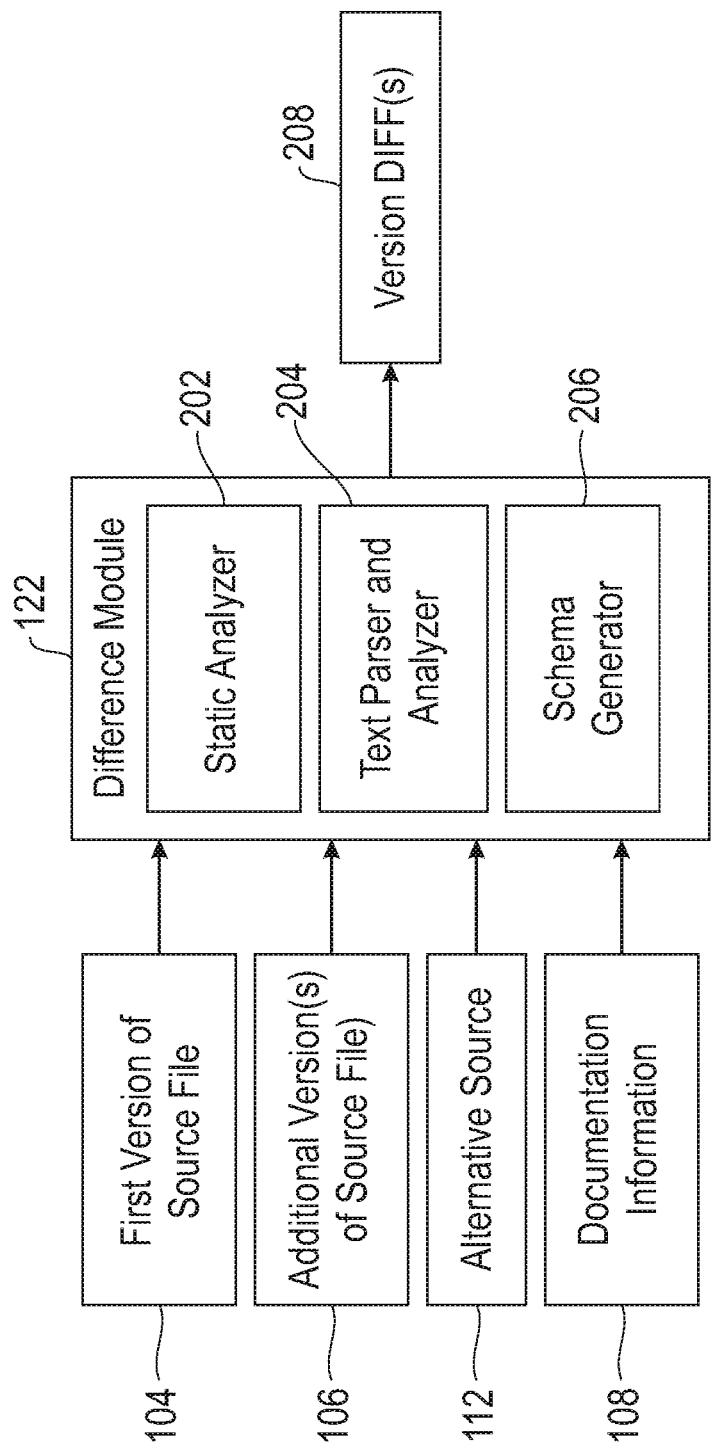
FIG. 2A-2C are flow diagrams of operations associated with components of the system architecture in accordance with exemplary embodiments.
Figure 2B:
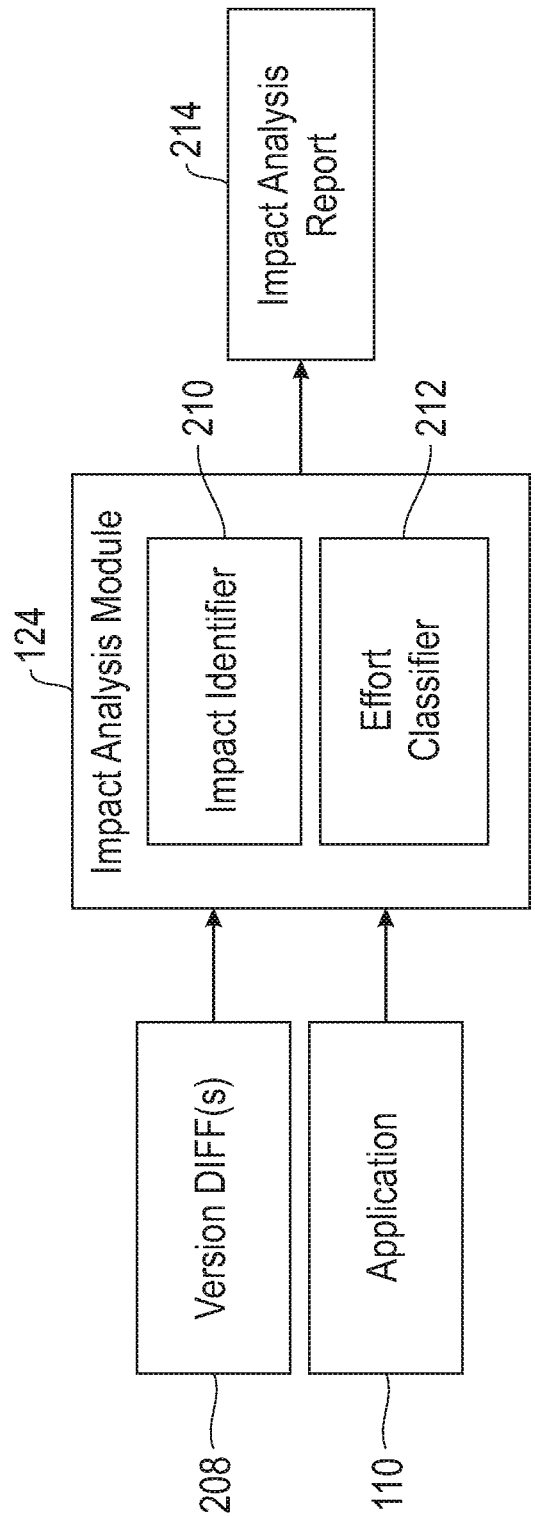
Figure 2C:
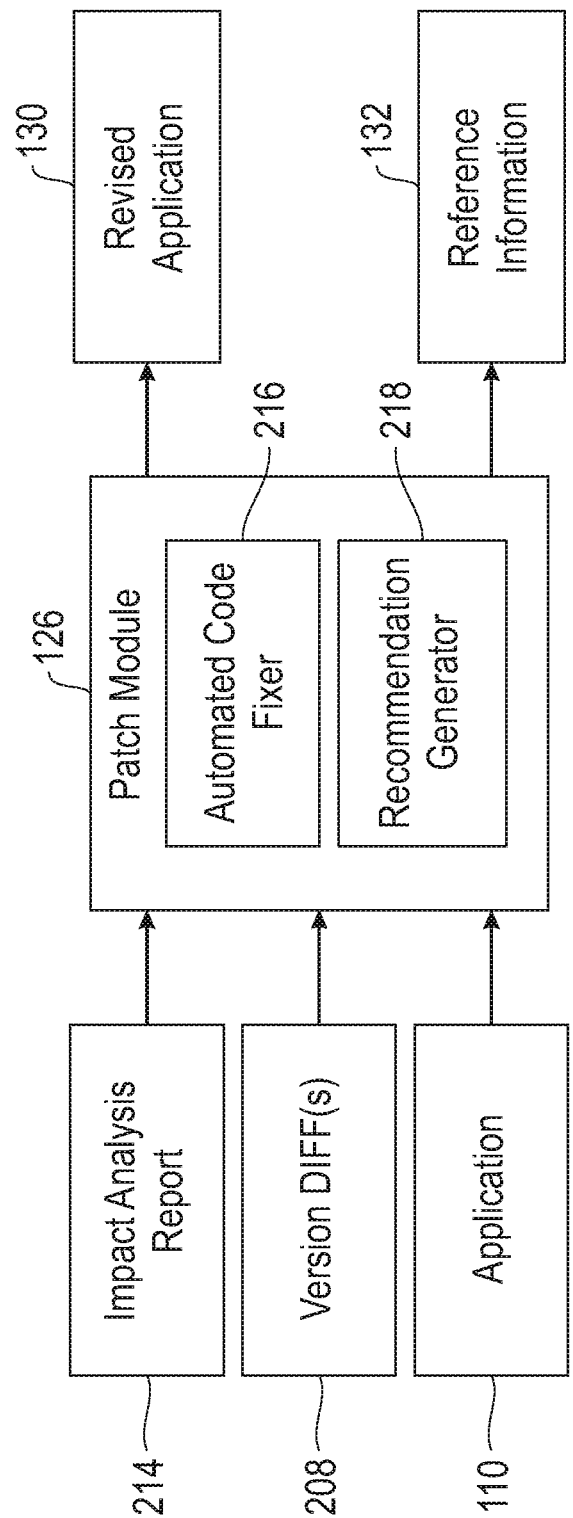

FIGS. 2A-2C show flow diagrams of operations corresponding to the difference module 122, impact analysis module 124, and patch module 126, respectively, in accordance with exemplary embodiments.

In the FIG. 2A embodiment, the difference module 122 includes a static analyzer 202, a text parser and analyzer 204, and a schema generator 206. The static analyzer 202 performs a static analysis on the source code of the first version of the source file 104 and on each of the additional versions 106 and/or the alternative source file 112. Based on the results of the static analyzer 202, the differences in source code between the first version 104 and each of the potential upgrade candidates (i.e., the additional versions 106 and/or the alternative source file 112) may be determined. The text parser and analyzer 204 also obtains documentation information 108 for the first version 104 and each of potential upgrade candidates. The documentation information 108 may include, for example, information from an official online source and/or unofficial information from a third-party online source (such as, for example, Stack Overflow®). The schema generator 206 identifies differences between the first version 104 and each of the upgrade candidates based on the results of the text parser and analyzer 204. The schema generator 206 generates a catalog of these differences (or DIFFs) based on a predefined schema. The schema generator 206 then outputs a file of the version DIFFs 208, such as, for example, in a JSON format.

Referring also to FIG. 2B, the impact analysis module 124 obtains the version DIFFs 208 from the difference module 122 and the application 110 (in the form of, e.g., source code). The impact analysis module 124 includes an impact identifier 210 that identifies the impact of the version DIFFs 208 on the application 110. By way of example, the impact analysis module 124 may determine specific portions of the application 110 that are impacted on a granular level (e.g., a method level) by each of the differences. The impact analysis module 124 also includes an effort classifier 212 that classifies the effort required to fix (or patch) the application 110 so that it supports a given one of the upgrade candidates. The classification may include assigning a value to indicate the effort required. As non-limiting examples, the values may correspond to the following set of labels: low, medium, or high; or may be assigned a number (e.g., 1-10), etc. The impact analysis module 124 then outputs an impact analysis report 214 that includes the impacted portions of the application 110 and the estimated efforts.

In the example shown in FIG. 2C, the patch module 126 includes an automated code fixer 216 and a recommendation generator 218. In response to a selection of a particular upgrade candidate (such as, for example, via a user input or automatically based on an overall effort estimated for each of the upgrade candidates), the automated code fixer 216 automatically generates patches (or fixes) for the application 110 for at least a portion of the required changes. For example, the automated code fixer 216 may generate patches for the differences that are classified as 'low' effort in the impact analysis report 214 or satisfy some predetermined effort threshold value. A recommendation generator 218 of the patch module 126 may generate reference information 132, which may include one or more recommendations for any code changes that were not automatically patched. The reference information 132 may also include information from online sources (such as Stack Overflow®) that explains at least some of the recommended code changes and/or automated patches. The reference information 132 may be in a question and answer format and/or include one or more relevant code snippets, for example. In some examples, the patch module 126 outputs a revised application 130 that integrates the automated patches from the automated code fixer 216.

As noted herein, the text analysis (e.g., as discussed above with respect to the text parser and analyzer 204) may be performed on code documentation information. According to one or more example embodiments, the text analysis extracts references to classes and/or methods from the natural language description provided in the documentation information. The changes may be in, for example, method names, parameters, return values, ways of instantiation, etc. The text analysis thus may include automatically extracting rules to support these different types of changes.

Figure 3:
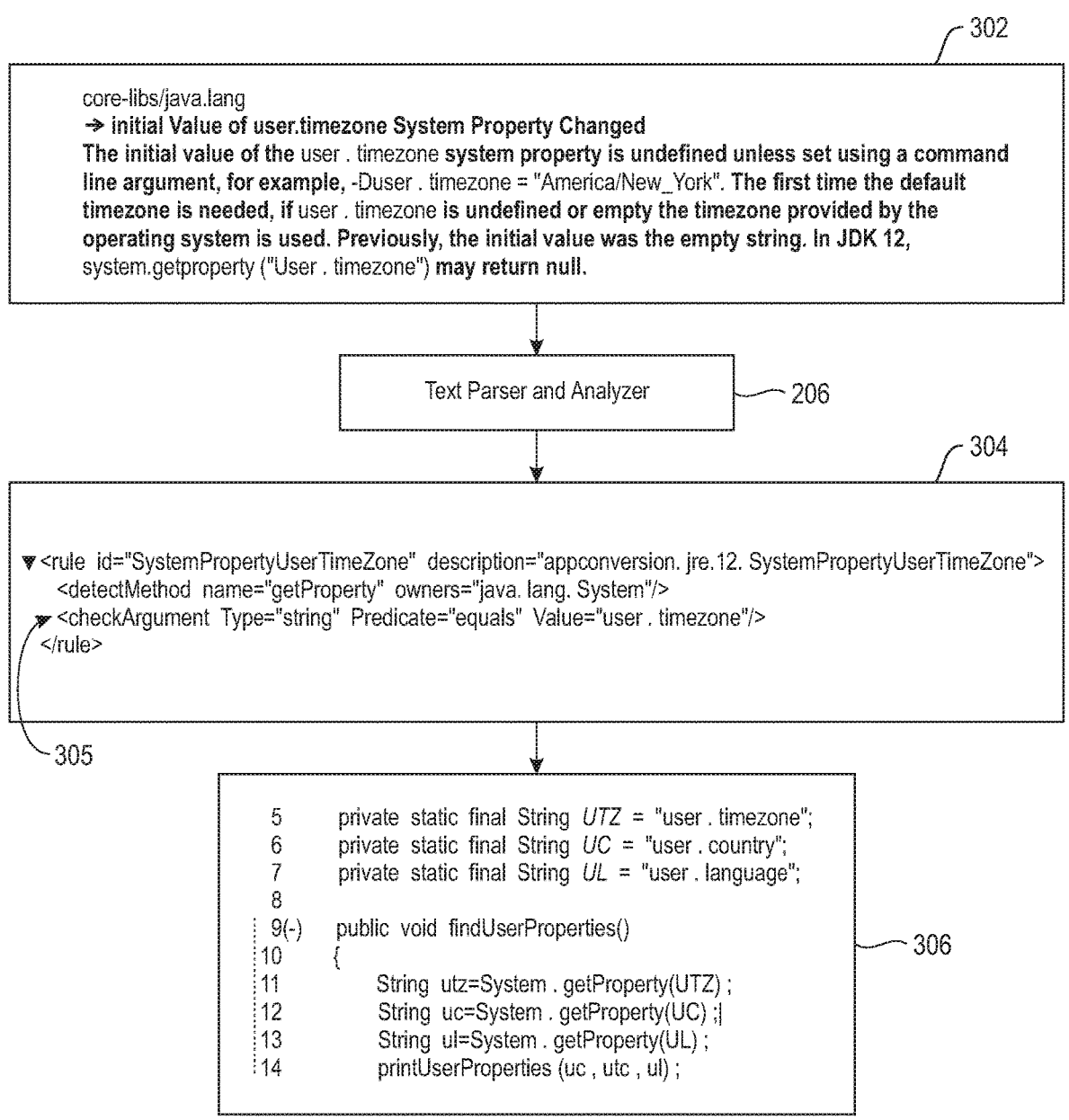
FIG. 3 is a diagram illustrating an example of a text analysis process in accordance with exemplary embodiments.

FIG. 3 is a diagram illustrating an example flow diagram of a text analysis in accordance with exemplary embodiments. In this example, code documentation information 302 is provided as input to the text parser and analyzer 204. The code document information 302 relates to documentation information for Java® library. The text parser and analyzer 204 includes an automated rule extractor (e.g., a miner), that analyzes the code documentation information 302 to extract relevant portions and to generate new rules. In the example shown in FIG. 3, a rule 304 is generated in an xml format. The relevant portion extracted from the code documentation information 302 is indicated in line 305. By applying static code analysis using data flow and control flow, pieces of code that match the rule 302 can be precisely identified using static code analysis. Code snippet 306 shows an example of code that is found based on the rule 304.

FIG. 4 shows an example of schema 400 in accordance with exemplary embodiments. The schema 400 may be associated with, for example, schema generator 206. In this example, the schema 400 is in a JSON format and shows differences between different versions of APIs. In particular, the schema 400 captures the following information: a fully qualified method name 402, the type of the change 404, priority 406 of the change, the value in the first version 408, the value in the second version 410, relation 412 between the values in the two versions, the index 414, and additional information 416.

Generally, the type of the change 404 may indicate, for example, that the method is deprecated, removed, return type changed, parameter type changed, annotations changed, or an exception list changed. The priority 406 of the change may be for example, a low priority if annotations are changed (which requires no code change to fix). If the return type has changed, then the value 408 may indicate the return type in version 1, and value 410 may indicate the value in version 2. The relation 412 may indicate, for example, whether the values are: unrelated, the same, a boxing relation, an unboxing relation, a to string relation, a from string relation, a sub to super class relation, or a super to sub relation. The index 414 is the value used for analyzing whether parameters are changed. The additional information 416 may be used to gather information, such as, for example, JavaDoc which can then be analyzed in case of deprecated methods for finding alternatives to use.

By way of example, consider a software project that uses twelve dependencies (e.g., jar files). An exemplary embodiment may include a system (e.g., system 100) receiving an indication from a user (such as a developer, for example) recommending that the project be updated (or modernized). The system may extract the twelve dependencies from the project. The system may then identify whether there are updated versions of the dependencies and retrieve these dependencies along with any relevant information (e.g., java documentation libraries). For example, the information may be retrieved form a software repository (such as a repository in Maven, for example). The system then performs static and dynamic analysis of the code of the software project and each of the updated versions to generate a report that shows the differences between the different versions. For example, if the software project current is using version 1.6 of a jar file, and there are now two newer versions (e.g., version 1.7 and 1.8), then the report will show the differences for each of the versions. Based on the differences in this report, the system then generates an impact analysis report that captures the potential code complexity based on the type of changes between the different versions. These reports may be output to the developer via a graphical user interface, for example, and the developer may select one of the newer versions based on the information in the reports. The system then recommends changes to the code in the project and/or automatically updates the code in the project with the changes. The changes may pertain to specific files and specific signatures. Optionally, the system can generate output explaining information related to each of the changes based on one or more online sources such as, Stack Overflow threads, for example. Accordingly, one or more of the dependencies in the project are modernized with newer versions of the dependencies.

In some exemplary embodiments, the system may prioritize (or rank) different versions of a given dependency based on the impact analysis and the differences report. Referring again to the example above, the system may rank version 1.7 of the dependency higher than version 1.8, if, for example, upgrading to version 1.7 involves fewer (or less complex) code changes.

According to at least on exemplary embodiment, word embeddings and/or wordnets may be used to identify information (e.g., posts) from online sources. For example, the online source can be searched using word embeddings and/or wordnets to identify synonyms for words such as, for example 'modernize', 'newer', 'latest', 'recent'+'version', 'release', 'arrival', etc., for different dependencies. By way of example, the system may search for text corresponding to a first dependency (e.g., .jar file) and identify posts that suggests one or more alternate dependencies (or libraries). The system may use the text from the post to then search for the alternate dependencies in a software repository (such as, Maven, for example), and then identify usage information for the first and alternate dependencies from, for example, a version control system (such as, Git, for example). The static and dynamic analysis of the code may be performed on the first and alternate dependencies. In this way, the differences report may identify the differences between the first dependency and the alternate dependencies. The report may include differences for the versions based on a certain date (e.g., since 2012). In this example, the impact analysis report may also include the alternate dependencies. The relevant posts corresponding to the alternate dependencies may also be output to the developer.

Additionally, at least one exemplary embodiment includes identifying licenses corresponding to the first and alternate dependencies, and also identifying the developer's preferences for different types of licenses (e.g., based on the developer's prior history with the version control system). The system may then prioritize (or rank) these dependencies based at least in part one these constraints (e.g., developer preferences and licenses).

Figure 5:
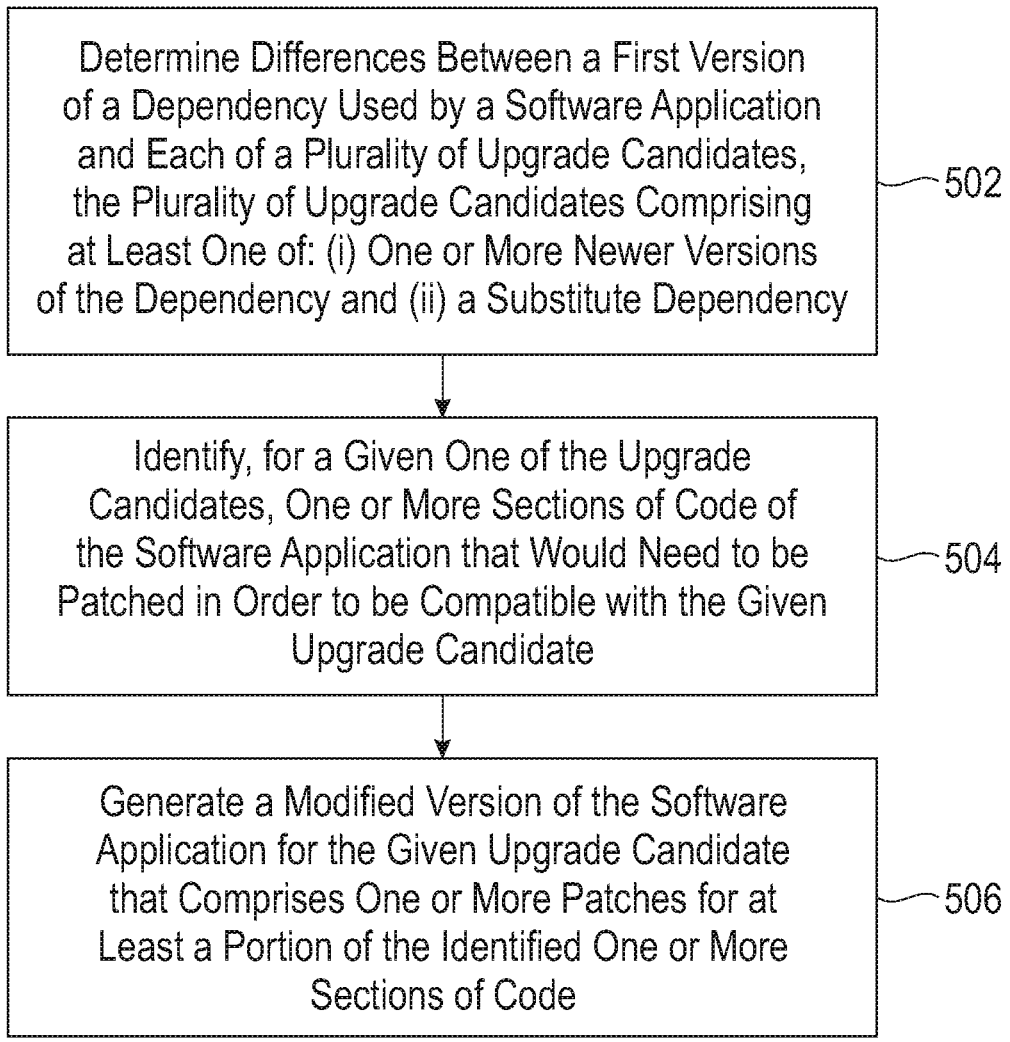
FIG. 5 is a flow diagram illustrating techniques in accordance with exemplary embodiments.

FIG. 5 is a flow diagram illustrating techniques in accordance with exemplary embodiments. Step 502 includes determining differences between a first version of a dependency used by a software application and each of a plurality of upgrade candidates, the plurality of upgrade candidates comprising at least one of: (i) one or more newer versions of the dependency and (ii) a substitute dependency. Step 504 includes identifying, based on the determined differences for a given one of the upgrade candidates, one or more sections of code of the software application that need to be patched in order to be compatible with the given upgrade candidate. Step 506 includes generating a modified version of the software application for the given upgrade candidate that comprises one or more patches for at least a portion of the identified one or more sections of code.

Step 502 may include performing a static analysis on source code of (i) the first version of the dependency and (ii) each of the plurality of upgrade candidates. Step 502 may include obtaining documentation information associated with the first version of the dependency and documentation information associated with each of the plurality of upgrade candidates; and performing an automated textual analysis of the obtained documentation information. Step 504 may include classifying the complexity of patching the identified one or more sections of code of the software application. Step 504 may be performed for each of the upgrade candidates, and the process may include steps of: ranking the upgrade candidates based at least in part on the classifying; and outputting a list of said upgrade candidates, based on said ranking, to a human-computer interface. Step 506 may be performed in response to user input with respect to at least one of the upgrade candidates in the list. The process in FIG. 5 may include a step of, in response to user input with respect to at least one of the upgrade candidates in the list, outputting information associated with the one or more sections of code of the software application that need to be patched in order to be compatible with the at least one upgrade candidate. The information may include reference information, from a third-party online source, that is relevant to a given one of the one or more sections of code that need to be patched. The ranking may be further based on one or more constraints. The one or more user constraints may include at least one of (i) one or more licensing constraints and (ii) one or more constraints associated with user preferences. Step 504 may be performed for each of the upgrade candidates, and the process may include a step of generating a summary indicative of: (i) the differences between the first version of the dependency and each of the upgrade candidates, (ii) the identified one or more sections of code of the software application that need to be patched for each of the upgrade candidates, and (iii) the complexity of patching each of the identified one or more sections of code of the software application for each of the upgrade candidates. The summary may be stored in an open-standard file format such as, for example, a JavaScript Object Notation format.

According to another example of an embodiment, a computer-implemented method includes determining at least one outdated software library used by a software application; performing a static analysis of (i) the at least one outdated software library and (ii) one or more upgrade options for replacing the at least one outdated software library; performing a text analysis of (i) documentation information of the at least one outdated software library and (ii) documentation information of the one or more upgrade options; and generating a report comprising (i) differences identified between the outdated software library and each of the upgrade options based at least in part on the static analysis and the text analysis, (ii) one or more pieces of code in the software application that require modification in order to upgrade to each of the one or more upgrade options; and (iii) effort required to perform the required modification of the one or more pieces of code for each of the upgrade options.

One or more exemplary embodiments may include maintaining a dashboard that shows potential upgrade options for dependencies currently used in a software project. For example, the dashboard may include project dependencies, the latest version corresponding to the dependencies, the release dates, estimated effort values (e.g., low, medium, high), the recommended update version (e.g., based on both the importance of changes in the dependency and the effort required to update), as well as the release date of the recommended update version.

In response to user input, the dashboard could be updated to show more detailed information for specific ones of the dependencies in the project. For example, the dashboard may include information for different versions of the dependencies, corresponding release dates, the size of the dependencies, a summary with respect to the current version, and the estimated effort for updating from the current version to one of the newer versions. The summary may indicate, for example, a number of APIs that were removed and/or deprecated relative to the current version. Those skilled in the art will appreciate that information relating to alternative dependencies may also be displayed in such a dashboard.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 6:
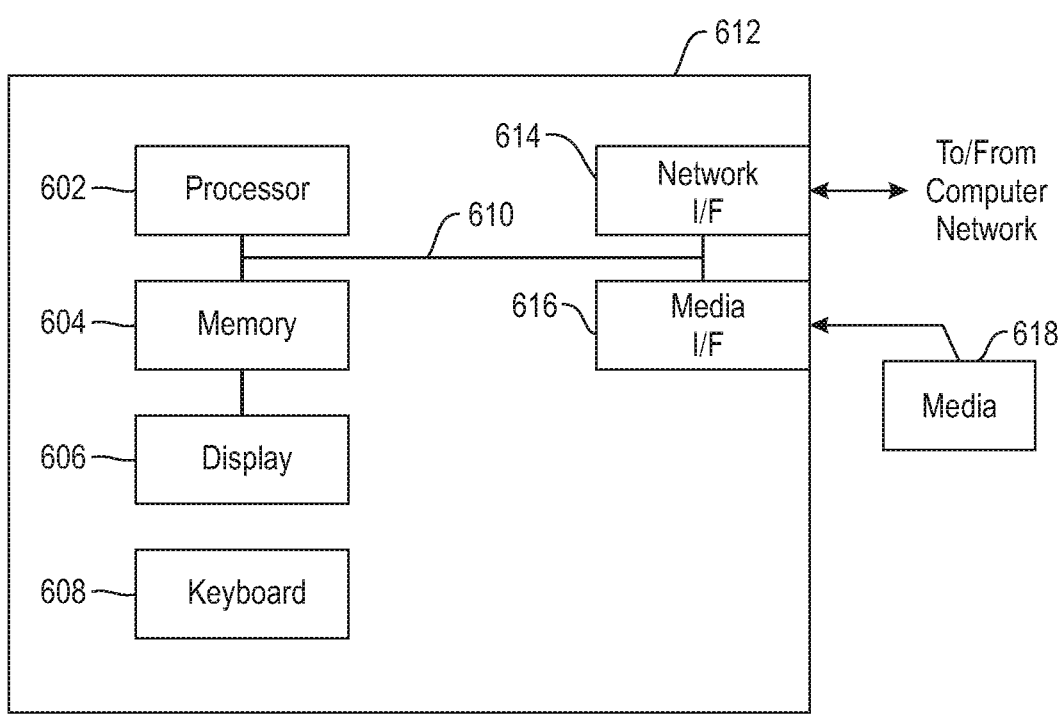
FIG. 6 is a system diagram of an exemplary computer system on which at least one embodiment of the present disclosure can be implemented.

Additionally, an embodiment of the present disclosure can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
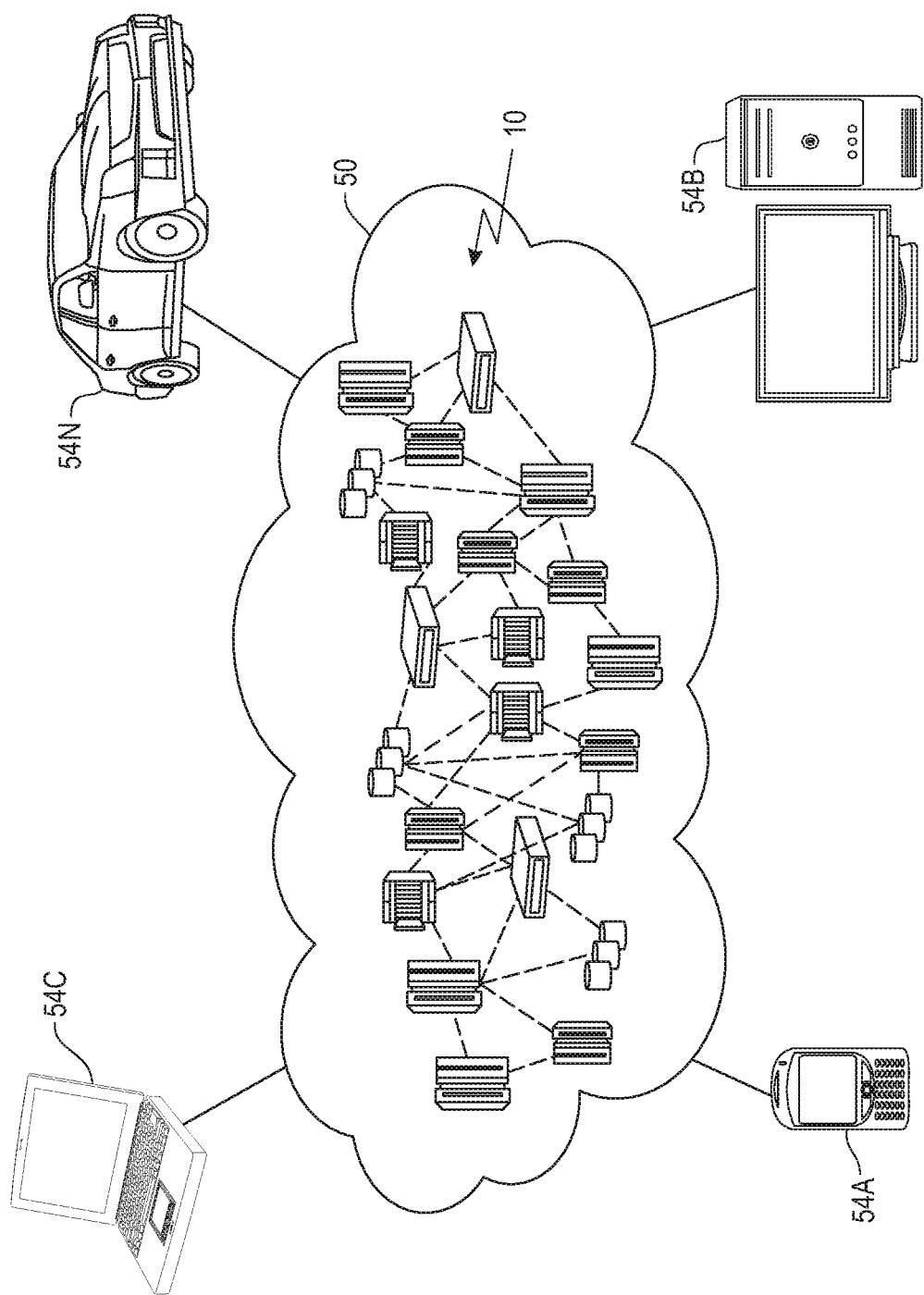
FIG. 7 depicts a cloud computing environment in accordance with exemplary embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
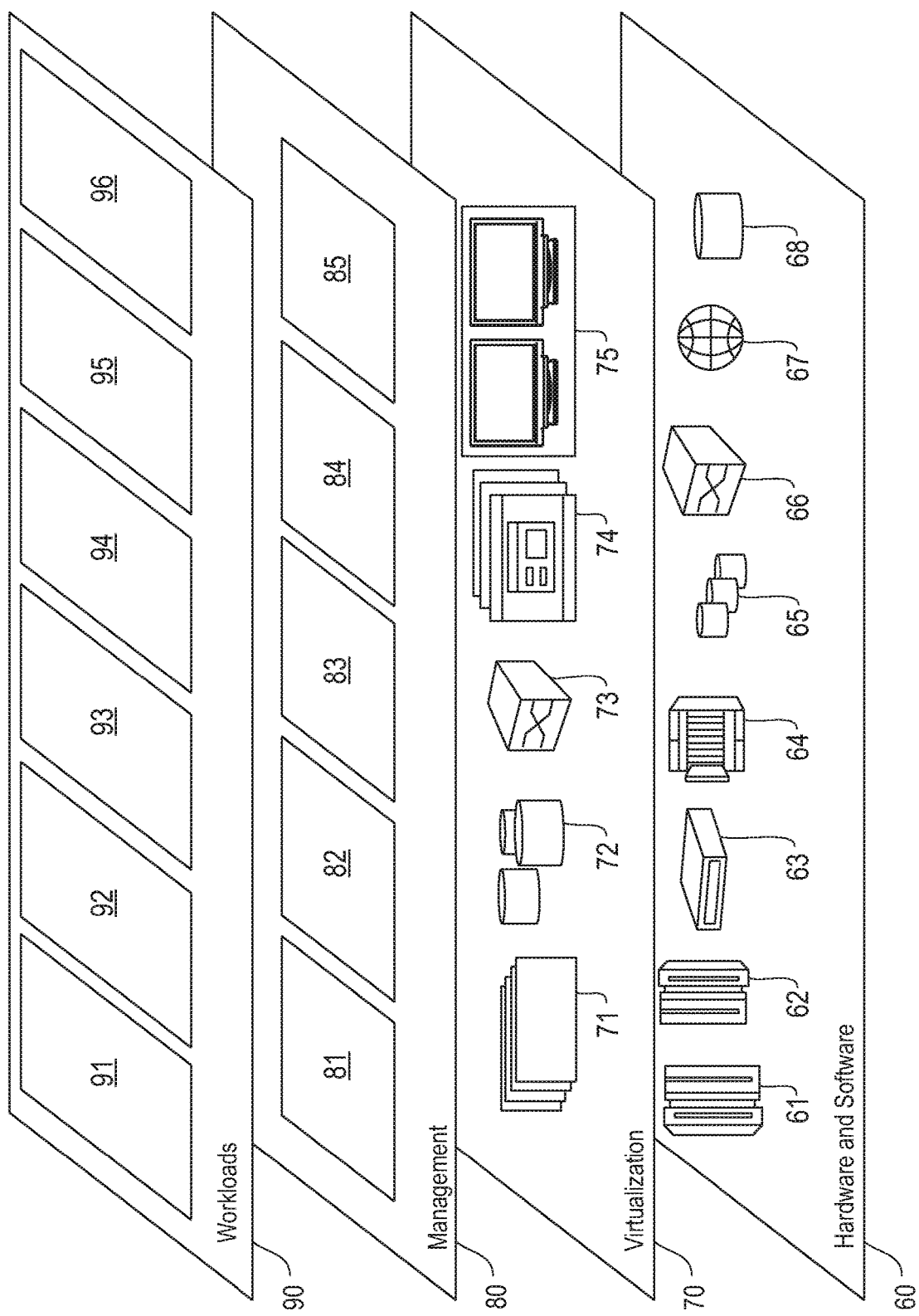
FIG. 8 depicts abstraction model layers in accordance with exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assisting dependency migration 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, modernizing applications, thus improving, for example, the security and reliability of the application. Also, at least one embodiment of the present disclosure may provide a beneficial effect such as, for example, automating at least a portion of the process for upgrading or migrating dependencies.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   determining differences between a current version of a dependency used by a software application and each of a plurality of upgrade candidates, the plurality of upgrade candidates comprising at least one of: (i) one or more newer versions of the dependency and (ii) a substitute dependency;
   identifying, based on the determined differences for a given one of the upgrade candidates, one or more sections of code of the software application that need to be patched in order to be compatible with the given upgrade candidate, wherein the identifying is performed for each of the upgrade candidates and comprises:
      classifying a complexity of patching the identified one or more section of code of the software application, and
      ranking the upgrade candidates based at least in part on the classifying and at least one of (i) one or more licensing constraints and (ii) one or more constraints associated with user preferences; and
   generating a modified version of the software application for the given upgrade candidate that comprises one or more patches for at least a portion of the identified one or more sections of code;
   wherein the method is carried out by at least one computing device.

2. The computer-implemented method of claim 1, wherein said determining the differences between the current version and each of the plurality of upgrade candidates comprises:
   performing a static analysis on source code of (i) the current version of the dependency and (ii) each of the plurality of upgrade candidates.

3. The computer-implemented method of claim 1, wherein said determining the differences between the current version and each of the plurality of upgrade candidates comprises:

obtaining documentation information associated with the current version of the dependency and documentation information associated with each of the plurality of upgrade candidates; and performing an automated textual analysis of the obtained documentation information.

4. The computer-implemented method of claim 1, wherein the method comprises:

outputting a list of said upgrade candidates, based on said ranking, to a human-computer interface.

5. The computer-implemented method of claim 4, wherein said generating the modified version of the software application is performed in response to user input with respect to at least one of the upgrade candidates in the list.

6. The computer-implemented method of claim 4, comprising:

in response to user input with respect to at least one of the upgrade candidates in the list, outputting information associated with the one or more sections of code of the software application that need to be patched in order to be compatible with the at least one upgrade candidate.

7. The computer-implemented method of claim 6, wherein said information comprises reference information, from a third-party online source, that is relevant to a given one of the one or more sections of code that need to be patched.

8. The computer-implemented method of claim 1, wherein the method comprises:

generating a summary indicative of: (i) the differences between the current version of the dependency and each of the upgrade candidates, (ii) the identified one or more sections of code of the software application that need to be patched for each of the upgrade candidates, and (iii) the complexity of patching each of the identified one or more sections of code of the software application for each of the upgrade candidates.

9. The computer-implemented method of claim 8, wherein the summary is stored in open-standard file format.

10. A computer program product comprising a computer readable storage medium having program instructions embodied therewith, the program instructions executable by a computing device to cause the computing device to:

determine differences between a current version of a dependency used by a software application and each of a plurality of upgrade candidates, the plurality of upgrade candidates comprising at least one of: (i) one or more newer versions of the dependency and (ii) a substitute dependency;

identify, based on the determined differences for a given one of the upgrade candidates, one or more sections of code of the software application that need to be patched in order to be compatible with the given upgrade candidate, wherein the identifying is performed for each of the upgrade candidates and comprises:

classifying a complexity of patching the identified one or more section of code of the software application, and ranking the upgrade candidates based at least in part on the classifying and at least one of (i) one or more licensing constraints and (ii) one or more constraints associated with user preferences; and generate a modified version of the software application for the given upgrade candidate that comprises one or more patches for at least a portion of the identified one or more sections of code.

11. The computer program product of claim 10, wherein said determining the differences between the current version and each of the plurality of upgrade candidates comprises:

performing a static analysis on source code of (i) the current version of the dependency and (ii) each of the plurality of upgrade candidates.

12. The computer program product of claim 10, wherein said determining the differences between the current version and each of the plurality of upgrade candidates comprises:

obtaining documentation information associated with the current version of the dependency and documentation information associated with each of the plurality of upgrade candidates; and performing an automated textual analysis of the obtained documentation information.

13. The computer program product of claim 12, wherein the program instructions further cause the computing device to:

outputting a list of said upgrade candidates, based on said ranking, to a human-computer interface.

14. The computer program product of claim 13, wherein said generating the modified version of the software application is performed in response to user input with respect to at least one of the upgrade candidates in the list.

15. The computer program product of claim 13, wherein the program instructions further cause the computing device to:

in response to user input with one of the upgrade candidates in the list, output information associated with the one or more sections of code of the software application that need to be patched in order to be compatible with the given upgrade candidate.

16. The computer program product of claim 15, wherein said information comprises reference information, from a third-party online source, that is relevant to a given one of the one or more sections of code that need to be patched.

17. A system comprising:

a memory; and at least one processor operably coupled to the memory and configured for:

determining differences between a current version of a dependency used by a software application and each of a plurality of upgrade candidates, the plurality of upgrade candidates comprising at least one of: (i) one or more newer versions of the dependency and (ii) a substitute dependency;

identifying, based on the determined differences for a given one of the upgrade candidates, one or more sections of code of the software application that need to be patched in order to be compatible with the given upgrade candidate, wherein the identifying is performed for each of the upgrade candidates and comprises:

classifying a complexity of patching the identified one or more section of code of the software application, and ranking the upgrade candidates based at least in part on the classifying and at least one of (i) one or more licensing constraints and (ii) one or more constraints associated with user preferences; and generating a modified version of the software application for the given upgrade candidate that comprises one or more patches for at least a portion of the identified one or more sections of code.

18. The system of claim 17, wherein said determining the differences between the current version and each of the plurality of upgrade candidates comprises:

performing a static analysis on source code of (i) the current version of the dependency and (ii) each of the plurality of upgrade candidates.

19. The system of claim 17, wherein said determining the differences between the current version and each of the plurality of upgrade candidates comprises:

obtaining documentation information associated with the current version of the dependency and documentation information associated with each of the plurality of upgrade candidates; and performing an automated textual analysis of the obtained documentation information.

20. The system of claim 17, wherein the at least one processor is further configured for:

outputting a list of said upgrade candidates, based on said ranking, to a human-computer interface.

\* \* \* \* \*